July 18, 1944. E. E. LINDSEY 2,353,912
MEANS FOR HOMOGENIZING AND HEAT TREATING FLUIDS
Filed April 23, 1940
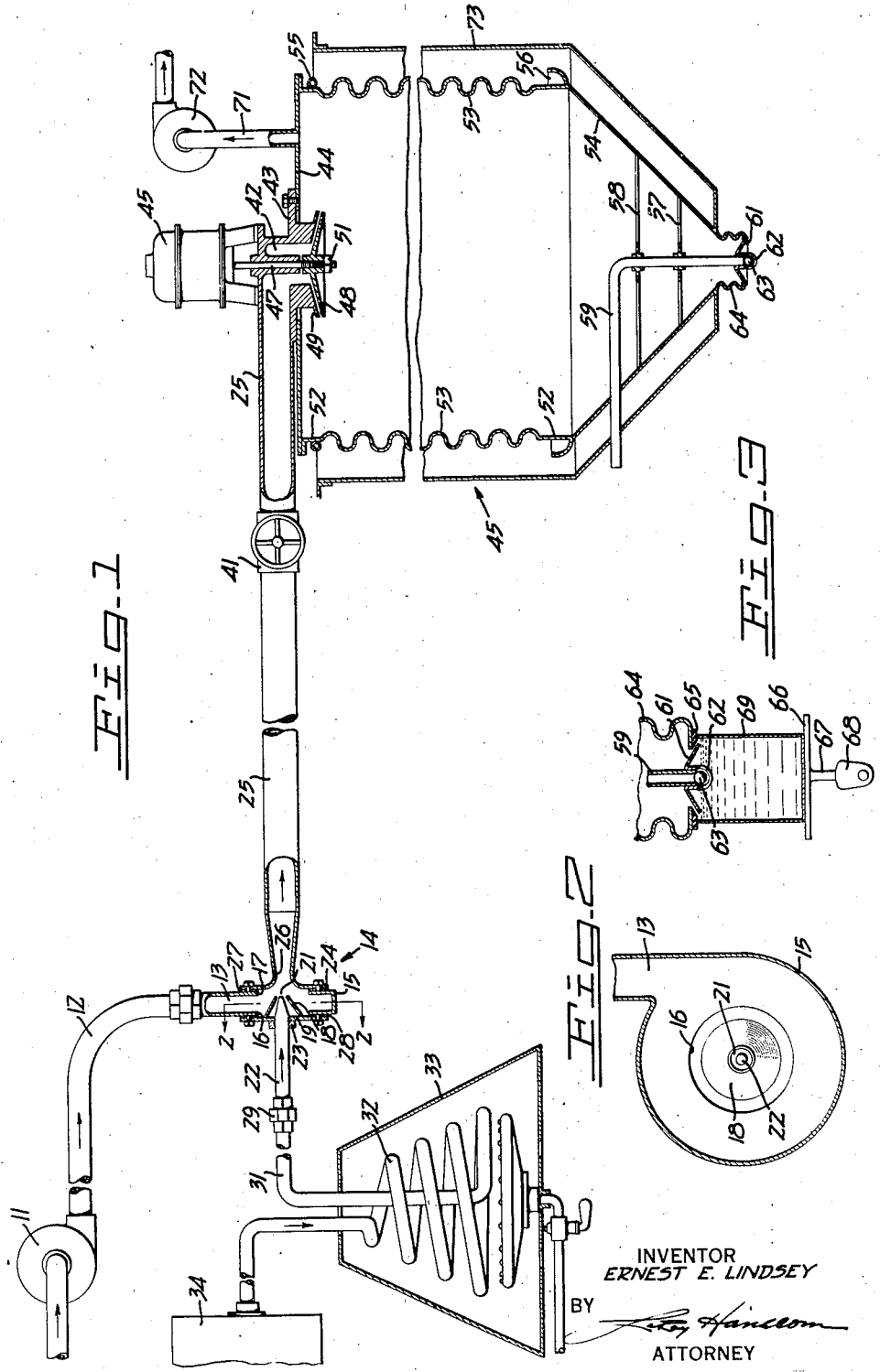
INVENTOR
ERNEST E. LINDSEY
BY
ATTORNEY Patented July 18, 1944

2,353,912

UNITED STATES PATENT OFFICE 2,353,912

MEANS FOR HOMOGENIZING AND HEAT-TREATING FLUIDS

Ernest E. Lindsey, Los Angeles, Calif., assignor of one-half to Elmer H. Berryman, San Francisco, Calif.

Application April 23, 1940, Serial No. 331,153

2 Claims. (Cl. 261—79)

This invention relates to a device for continuously homogenizing and heat treating fluid suspensions such as fruit and vegetable juices, milk, and the like for the purpose of sterilizing, pasteurizing, or cooking materials of this general character.

As is well known, microorganisms may be killed by subjecting them to heat. The amount of heat required depends upon the nature of the organism being dealt with and is a function of time as well as of temperature. In other words, it is possible to kill microorganisms by subjecting them to relatively low temperatures for a considerable period of time or by subjecting them to relatively high temperatures for only a much shorter period of time. The problem of pasteurizing or sterilizing many fluids is therefore reduced to effecting an efficient heat exchange between the microorganisms contained in such fluids and the working medium or source of heat being used, and this result can be best accomplished by first homogenizing the material under treatment.

In general, the object of this invention is the provision of an efficient homogenizer and heat exchanger for continuously and instantaneously heat treating fluids containing microorganisms and other solids in suspension.

More specifically, one of the objects of this invention is the provision of a homogenizer in which superheated or live steam is used for the dual purpose of instantaneously homogenizing the fluid under treatment and elevating its temperature.

Another object of this invention is the provision in combination with a continuous homogenizer and heat exchanger, of a cooler for rapidly reducing the temperature of the homogenized and sterilized fluid.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Figure 1 is a diagrammatic representation of the homogenizer, heat exchanger, and liquid dispenser embodying the various objects of my invention.

Figure 2 is an enlarged section taken on the line 2—2 of Figure 1.

Figure 3 is an enlarged detail of the dispenser or can filling mechanism formed as a part of the lower end of the cooler shown in Figure 1.

As shown in the drawing, the fluid or suspension to be treated is delivered through a pump 11 or other convenient means such as a static head and conduit 12 to the tangential intake 13 of a homogenizer generally indicated by the reference numeral 14.

The homogenizer 14 comprises a short cylindrical casing 15 having opposed coaxial circular openings 16 and 17. Attached to the rear face of the casing 15 is an inwardly extending outwardly flanged conical deflector 18 formed with an aperture 21 at its apex and with a threaded web 19 for the reception of a nozzle 22. The nozzle 22 is locked in place with its forward end seated in the apex of the conical deflector 18 by a lock nut 23. Suitably attached to the forward face of the casing 15 by means of a flange 24 is a pipe or conduit 25 having a restricted throat 26. If found necessary in order to make fluid tight joints, gaskets 27 and 28 may be interposed respectively between the casing 15 and the flange of the conical deflector 18 and between the casing 15 and the flange 24 of the conduit 25.

The rear end of the nozzle 22 communicates through a union 29 and a pipe 31 with the coils 32 of a gas heater 33, the intake of the coils 32 communicating with a steam boiler 34 or other suitable source of steam.

From the description so far made of my invention it will be seen that the fluid material to be sterilized is continuously delivered under pressure to the casing 15 where due to its tangential delivery and to the conical deflector 18, it is given a considerable degree of turbulence before passing out through the restricted throat 26 of the pipe 25. As the cold liquid enters the mouth of the pipe 25 it is struck by the steam entering from the nozzle 22 at high velocity. Condensation immediately takes place, the steam giving up its heat and the condensate or minute water particles, retaining substantially the velocity of the steam, become liquid missiles which tend to bombard and tear apart the material under treatment. The heat carried by the superheated steam discharged through the nozzle 22 is instantly dispersed and conveyed to the material under treatment under such conditions that there is no burning or scorching of the said material such as would occur if the material were brought into contact with, for instance, a plate heated to the same temperature as the superheated steam passing the nozzle 22.

The material thus treated is preferably held within a fluid column for the length of time desired to insure sterilization, and for this purpose I prefer to insert in the line 25 a valve 41, though the same result may be accomplished by adjusting the plate 48 so that the clearance between it and the base 49 forms a constricted passage.

The outer end of the pipe 25 communicates tangentially with a circular chamber 42 formed in a spray header 43 carried by the cover plate 44 of a cooler generally designated by the reference numeral 45. Seated on the spray header 43 is a motor 46 provided with a downwardly extending shaft 47. Threaded to the end of this shaft is a conical rotary plate 48 arranged to underlie the base 49 of the spray header 43. Any desired clearance between the base 49 of the spray header and the plate 48 can be obtained by simply adjusting the position of the plate 48 along the shaft 47 and securing the plate in that position by means of the lock nut 51.

Depending from the periphery of the cover plate 44 is a cylindrical shell 52 formed with corrugations 53 and terminating in a conical bottom 54. Surrounding the upper end of the shell 52 is a water manifold 55 formed with perforations along its lower edge so that water can drip on to the outer surfaces of the corrugations 53. Extending outwardly from the lower end of the cylinder 52 is a gutter or trough 56 for catching the water from the corrugations 53 and which communicates with a suitable drain.

Supported within the conical bottom 54 by spiders 57 and 58 is an air vent pipe 59 to the lower end of which is threaded a downwardly flaring valve seat 61. Depending from the pipe 59 is a ball cage 62 for the accommodation of a ball 63 arranged to seat against and close the mouth of the pipe. Secured to and depending from the lower end of the conical bottom 54 is a Sylphon 64 provided on its lower periphery with a rubber valve ring 65 arranged to contact the valve seat 61 when the Sylphon is in its downwardly extended position.

Located beneath and in registration with the Sylphon 64 is a table 66 formed with a downwardly extending cam follower 67 cooperatively associated with a cam 68. Rotation of the cam 68 results in a periodic vertical movement of the table 66. On successively feeding cans 69 or other containers to the table 66, the cans are elevated so that their upper peripheries are sealed against the valve ring 65 and lift the valve ring from the valve seat 61.

Communicating with the cover plate 44 through a pipe 71 is a vacuum pump 72 for exhausting from the cooler 45 such gaseous vapors as may be desirable. It will be seen that by creating a partial vacuum within the tank 45, all of the water of condensation caused by the condensing of the stem ejected through the nozzle 22 may be removed, in fact at this point the device may be used as an evaporator also.

For certain purposes it is desirable to secure a housing 73 about the shell 52 so as to insulate the shell from atmospheric temperatures.

After the material under treatment has passed through the sterilizer and homogenizer 14, it passes through the valve 41 and is spun off the periphery of the rotary conical plate 48 forming part of the spray header 43, to the interior of the corrugated shell 52. The drops of material then tumble over the corrugations 53 into the conical bottom 54 and in so doing there is a very efficient heat exchange between the drops of material and the shell 52 and between the shell 52 and the water passing downwardly over the exterior of the shell. This action not only "tumbles" but rolls the liquid over and over and tends to bring all of the liquid particles into direct contact with the surface of the corrugations. Also, the circular form of the tank tends to reduce wavelets or channeling and the collection of the liquid into wavelets of considerable volume.

As above described, the treated and cooled material is periodically delivered through the action of the Sylphon 64 to the cans or containers 69. The air contained in the cans 69 is permitted to pass upwardly through the pipe 59 until the ball 63 is floated against the inlet of the pipe.

From the above description it will be noted that I have provided means by which any fluid material may be instantaneously and simultaneously homogenized and sterilized, pasteurized, or cooked, by the dual action of a current of steam at the desired temperature traveling at relatively high velocities. In addition to such means and in combination therewith, I have provided means for effectively cooling the treated material and delivering it to suitable containers.

The precise temperatures and pressures of steam required to sterilize or pasteurize any given material depends of course upon the nature of the microorganisms contained in such material, but these are conditions which if not already known can readily be ascertained by a few preliminary experiments.

Under present methods of sterilization it is necessary to hold the material under treatment at a relatively low temperature for a period of time ranging anywhere from several minutes to several days. By the use of the homogenizer and sterilizer herein described, it is possible to obtain the same result instantaneously and continuously and from a commercial standpoint the saving of time so effected is highly desirable. It should also be observed that the construction of the homogenizer 14 is such that it can be very readily dismantled, cleaned, and reassembled whenever that is deemed necessary.

I claim:

1. A device for homogenizing and heat treating edible fluid materials comprising: a generally cylindrical chamber formed on its periphery with a tangential intake for the material to be homogenized and heat treated; an axial, inwardly extending, inwardly converging conical deflector supported by one end wall of said cylinder opposite said tangential intake; an axial steam nozzle communicating with the interior of said chamber through the apex of said conical deflector; an axial outlet pipe secured to the other end wall of said chamber; and a valve associated with said outlet pipe for controlling the rate of flow of fluid therethrough.

2. A device for homogenizing and heat treating edible fluid materials comprising: a generally cylindrical chamber formed on its periphery with a tangential intake for the material to be homogenized and heat treated; an axial, inwardly extending, inwardly converging conical deflector supported by one end wall of said cylinder opposite said tangential intake; an axial steam nozzle communicating with the interior of said chamber through the apex of said conical deflector; an axial outlet pipe secured to the other end wall of said chamber and formed with a restricted throat; and a valve associated with said outlet pipe for controlling the rate of flow of fluid therethrough.

ERNEST E. LINDSEY.